ELECTRO-SENSITIVE MAGNETIC RECORDING APPARATUS AND METHOD

Filed Feb. 28, 1966 2 Sheets-Sheet 1

INVENTORS
PAUL E. STOFT
DALE R. DAVIS

BY Q. C. Smith
ATTORNEY

INVENTORS
PAUL E. STOFT
DALE R. DAVIS

BY Q. C. Smith

ATTORNEY 3,474,456
ELECTRO-SENSITIVE MAGNETIC RECORDING APPARATUS AND METHOD

Paul E. Stoft, Menlo Park, and Dale R. Davis, Mountain View, Calif., assignors to Hewlett-Packard Company, Palo Alto, Calif., a corporation of California Filed Feb. 28, 1966, Ser. No. 530,500
Int. Cl. G01d 15/12
U.S. Cl. 346—74 2 Claims

ABSTRACT OF THE DISCLOSURE

Improved electromagnetic recording method and means produces a permanent record by disrupting a layer of magnetic material using an electrical writing signal which also produces a visibly contrasting surface mark. The record is read back magnetically by transducers which respond to the change in the characteristics of the magnetic path about the disruption in the layer of magnetic material.

This invention relates to the method and means for producing electrosensitive recordings and for magnetically reading such electrosensitive recordings.

It is the main object of the present invention to provide an improved electrosensitive recording medium and another object to provide the method and means for producing and reading recordings on such recording medium.

In accordance with the illustrated embodiment of the present invention, the electrosensitive recording medium includes a thin continuous layer of magnetic material which is interrupted in the regions of electrographically produced records thereon. These interruptions in the layer of magnetic material may be detected by a magnetic transducer.

Figure 1:
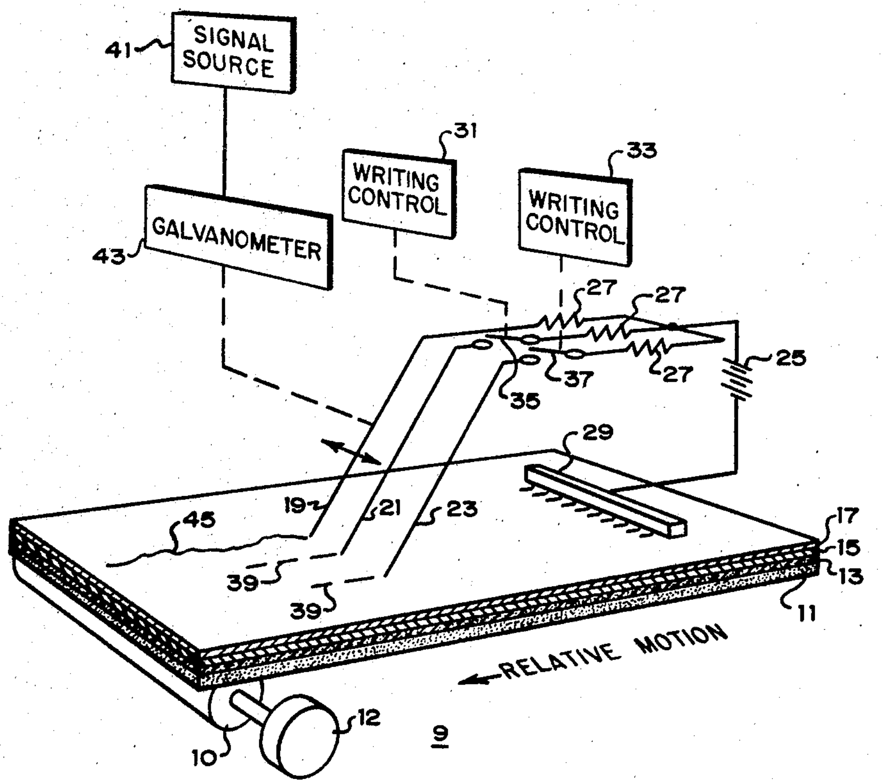
Figure 2:
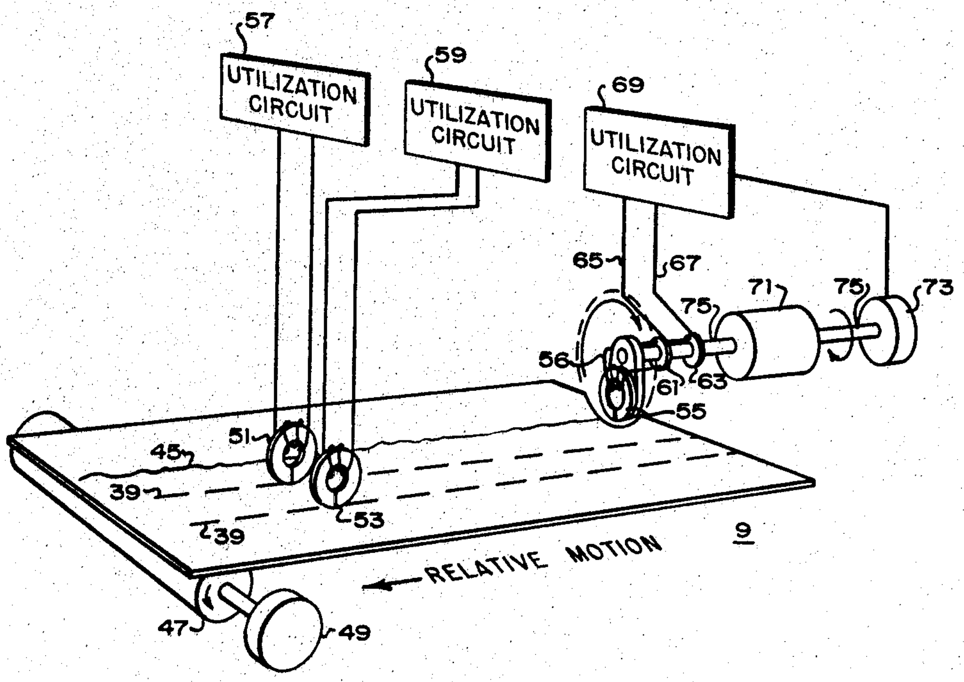

Referring to the drawing, FIGURE 1 is a schematic diagram of the electrosensitive recording medium and recording apparatus and FIGURE 2 is a schematic diagram of the recording medium detecting apparatus.

In FIGURE 1, the recording medium 9 includes a base layer 11 of non-conductive material such as paper or plastic on which is disposed a layer 13 of conductive material such as vapor-deposited aluminum or laminated aluminum foil having a thickness ideally of about 1 to 2500 microcentimeters. Thinner layers exhibit low conductance and hence require higher writing voltages while thicker layers show high conductance and require higher writing signal power. The conductive layer 13 is then coated with a magnetic material such as nickel, cobalt or iron by known methods such as vapor-deposition of the magnetic material onto the conductive layer 13 in an inert atmosphere at reduced pressure to produce the layer 15 of magnetic material having a thickness ideally within the range specified for the conductive layer 13. Alternatively, the layer 15 of magnetic material may be deposited directly onto the non-conductive base layer 11 to serve both as the electrically conductive layer and the magnetic layer. This magnetic layer 15 is then coated with an electrosensitive composition prepared according to one embodiment of the present invention as follows: 3 parts by weight of zinc oxide (New Jersey Zinc Co. No. HC–016) is combined with 1 part by weight of an organic binder (e.g. Goodyear Tire and Rubber Co. Vitel PE–200) and 6 parts by weight of a suitable solvent (e.g. Dupont Co.—tetrahydrofuran) and is ball-milled for several hours to form a finely divided suspension which is then aplied to the layer 15 of magnetic material with a wet thickness of about 4 mils. A heat-sensitive darkening agent such as nickel acetate and thiourea (each in a concentration of about 5% by weight of the solids in electrosensitive composition) may be added to improve the contrast of the record produced on the electrosensitive recording medium. The wet-coated composition may be vacuum dried to form the surface layer 17 of the recording medium 9. Alternatively, the layer of magnetic material may be coated with a composition which responds to another physical condition than electrical signal. For example, a commonly known pressure-sensitive coating such as blushed wax over contrasting background may be used as the surface coating over the layer of magnetic material.

In operation, the recording medium 9 is moved with respect to electrodes 19, 21 and 23 by suitable mechanical means such as by drive roller 10 and moter 12 as writing signals from source 25 are applied through resistors 27 to the electrodes 19–23 with respect to the contact wiper 29. Writing controls 31 and 33 control the switches 35 and 37 in the writing signal circuit of electrodes 21 and 23 for producing discrete event marks or digital-type records 39 and signal source 41 connected to galvanometer 43 linked to electrode 19 produces an analog-type record 45. In each case, writing signals of selected amplitude applied to the surface coating 17 of the recording medium 9 cause current to flow through this surface coating 17 and conductive layers 13 and 15 with sufficiently high current density in the regions beneath the contact area of the electrode 19–23 to elevate the temperature of these local regions of the recording medium 9. The elevated temperatures in the local regions cause some reduction of the zinc oxide to free zinc of contrasting color and also causes the heat-sensitive darkening agent to discolor and further increase the visual contrast of the records 39, 45 against the generally white background color of the surface coating 17. Also, the high current density in the local regions beneath the contact area of the electrodes 19–23 causes the magnetic material in the conductive layer 15 to evaporate and interrupt the conductive circuit through the particles of zinc and zinc oxide to the highly conductive layer 13 of aluminum. This causes writing signal to cease flowing in an electrode 19–23 after a visually contrasting mark 39, 45 is produced and leaves an interruption in the layer 15 of magnetic material. No contrasing marks or records are produced by the wiper contact 29 because of its wide area contact with the recording medium and the resulting low current density in the regions of wiper contact area. Also, when the surface coating is pressure sensitive, the magnetic layer 29 may be interrupted or its permeability otherwise altered in local record regions by mechanical means such by typing or by scribing with a stylus or pencil. Thus, whether the record 39, 45 is produced by an electrical signal or by a mechanical signal (i.e. surface pressure) applied to the surface layer 17, the magnetic properties of the layer 15 are sufficiently permanently altered (as by interrupting the magnetic layer) in the local regions of the recording medium to which signal was applied to be magnetically readable by the apparatus of FIGURE 2.

In FIGURE 2, the recording medium 9 having records 39, 45 thereon may be read magnetically as it is moved relative to the magnetic transducers 51, 53, 55 by suitable mechanical means such as drive roller 47 and motor 49. For reading the discrete marks 39, each of the magnetic transducers 51 and 53 may include a conventional gapped core of magnetic material having a signal winding thereon connected to a utilization circuit 57, 59. The utilization circuit 57, 59 may be adapted to respond to the change in permeabiilty of the magnetic layer 29 about the interruptions in the layer in the local regions of the contrasting records 39. Properly correlated using conventional means, the responses of the utilization circuits 57, 59 may thus reproduce the signals which orignally produced the records 39.

For reading the analog record 45, a rotary scanning mechanism is used which includes a magnetic transducer 55 having a signal winding 56 on a gapped core connected through slip rings 61, 63 and brushes 65, 67 to utilization circuit 69. The transducer 55 is rotated by motor 71 to follow the arcuate path of the recording medium 9 in the region of the analog record 45. The utilization circuit 69 responds to changes in the permeability of the magnetic layer 29 at the interruption therein which appear at the analog record 45. Encoder 73 is coupled by shaft 75 to the rotating transducer 55 for producing an electrical signal indicative of the angular position of the transducer 55 along the arcuate path of the record medium 9. Response of the utilization circuit 69 to a change is permeability of the recording medium 9 when the transducer 55 is in a selected angular positon along the arcuate path of the recording medium 9 is thus an indication of the amplitude of the analog record 45.

We claim:

1. Signal recording apparatus comprising:

a base layer;

an electrically conductive layer of magnetic material on said base layer;

an electrically conductive surface layer on said layer of magnetic material for producing a constrasting record thereon in a local region thereof in response to an electrical writing signal applied to the local region; and electrical writing means disposed to conaact at least said surface layer in a local region thereof for supplying writing signal to said layer in said local region with sufficient current density to remove the matreial of said layer in said local region.

2. A method of producing a recording comprising the steps of:

forming a recording medium by depositing onto a substrate an electrically conductive layer of magnetic material, the magnetic properties of which are permanently alterable;

depositing on said layer of magnetic material an electrically conductive surface layer which produces a contrasting record in a local region thereof to which an electrical signal is applied; and applying an electrical signal to a local region of the surface layer with sufficient current density to elevate the temperature in the local region for removing substantially only the layer of magnetic material in said local region.

References Cited

UNITED STATES PATENTS

| | | | |
|---|---|---|---|
| 2,258,106 | 10/1941 | Bryce | 346—74 |
| 2,547,838 | 4/1951 | Russell | 346—74 |
| 2,561,476 | 7/1951 | Lang | 346—74 |
| 3,299,433 | 1/1967 | Reis | 346—74 |

STANLEY M. URYNOWICZ, Jr., Primary Examiner

G. M. HOFFMAN, Assistant Examiner

U.S. Cl. X.R.

346—76; 117—239, 240